Dec. 28, 1948.   R. S. HART   2,457,669
STATIC SUPPRESSOR FOR MOISTURE METERS
Filed May 9, 1947
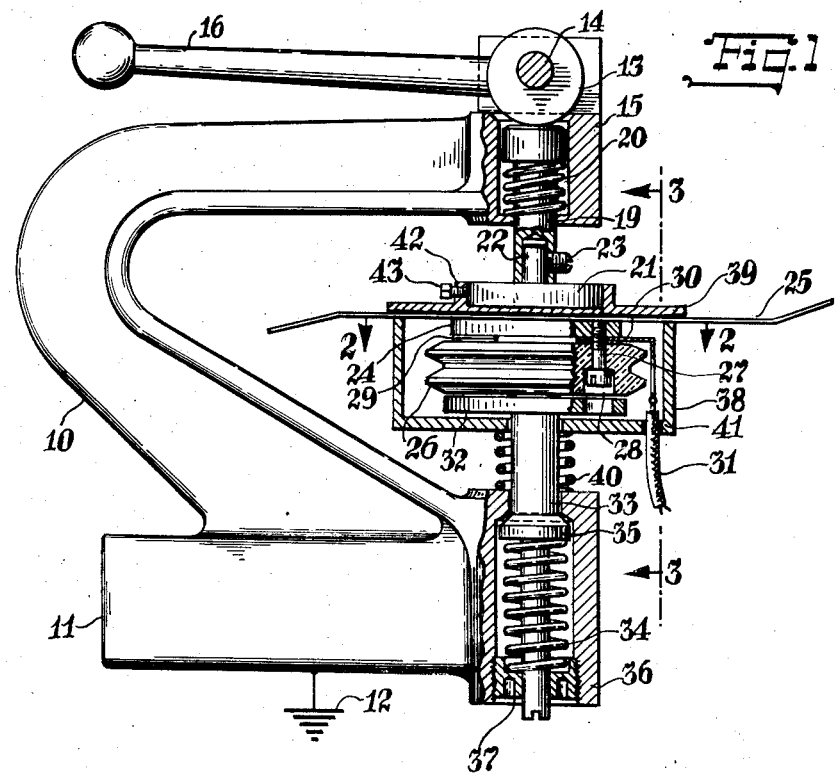
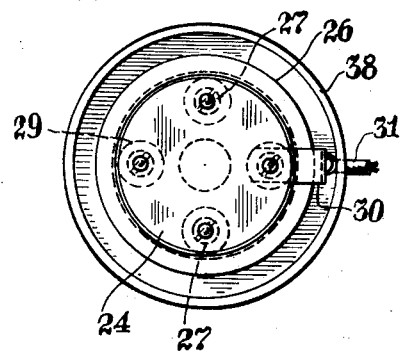
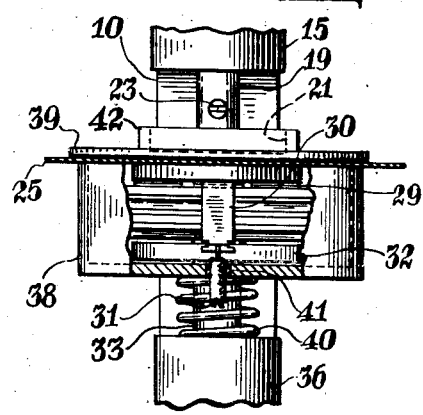
INVENTOR.
RAYMOND S. HART
BY
*M. Bjorndal*
ATTORNEY Patented Dec. 28, 1948

2,457,669

UNITED STATES PATENT OFFICE 2,457,669

STATIC SUPPRESSOR FOR MOISTURE METERS

Raymond S. Hart, Brooklyn, N. Y.

Application May 9, 1947, Serial No. 747,114

3 Claims. (Cl. 175—183)

1

The present invention relates to moisture meters and, more particularly, to a contactor for such meters of the type disclosed in my co-pending application Ser. No. 595,093, filed May 22, 1945, now abandoned.

Difficulties have been experienced heretofore, in carrying out measurements with the type of moisture meter above referred to, due to the ever present static disturbances which under some conditions made it virtually impossible to obtain a reliable reading. Thus, in order to utilize to the fullest the highly sensitive meter described in my aforesaid co-pending application, it has become apparent that some means had to be provided for the substantial elimination of such static interferences.

The general object of the present invention is to provide a static suppressor adapted to overcome the above difficulties.

The contactor referred to comprises two electrodes adapted for measuring the moisture content of sheet material such as paper, textile fabrics or the like, one of said electrodes being grounded to the body of the instrument. The interferences mentioned above will be particularly noticeable if the dimensions of the sheet are large, since the amount of static picked up thereby will be of corresponding magnitude. Accordingly, it is a more specific object of the invention to suppress static interferences by effectively grounding the sheet to be tested at points closely surrounding the electrodes of the instrument.

Another feature of the instrument described in my co-pending application is the fact that the grounded electrode is displaceable relative to the other electrode. It is another object of my invention to provide shielding means mechanically and galvanically connected to said grounded electrode.

There has further been disclosed in my copending application an adaptor which may be slipped over the grounded electrode for the purpose of measuring news print or similar papers, as well as the provision of a cup facilitating moisture measurements on powders. With such attachments the use of the static suppressor contemplated at present would be largely unnecessary and inconvenient. Hence it is another object of the invention to provide a static suppressor mounted detachably on the instrument.

The invention will be described in greater detail with reference to the accompanying drawing, showing a preferred embodiment, wherein:

Fig. 1 shows a static suppressor according to the

2 invention, mounted on a contactor of the type described in my co-pending application;

Fig. 2 is a plan view on line 2—2 of Fig. 1;

Fig. 3 is an elevation on line 3—3 of Fig. 1.

The contactor shown in Fig. 1 comprises a yoke 10, integral with a base 11 which is shown grounded at 12. A cam 13 is eccentrically mounted on a shaft 14 which is journaled in the head 15. A handle 16 serves to rotate the shaft 14 and cam 15, the latter acting upon the enlarged top of a plunger 19 against the force of a spring 20. A grounded electrode or plate 21 has its shank 22 secured to the plunger 19 by means of set screw 23.

In the position of the handle shown in Fig. 1, plunger 19 is at its lowermost point and plate 21 bears upon the ungrounded electrode or plate 24, being insulated therefrom by the sheet 25 the moisture of which is to be measured. Plate 24 is insulatingly supported on a disc 32 by means of a lucite insulator 26. In order to reduce the contact area between plate 24 and insulator 26, the two parts are fastened to each other by screws 27 threaded into the plate 24 and having their heads countersunk in recesses 28, the plate and the insulator being spaced by pairs of washers 29. For one of the screws, however, the top washer is replaced by a tag 30 connected to insulated lead-out wire 31. Disc 32 is supported by a stem 33, a compression spring 34 acting upon a shoulder 35 thereof in an upward direction. Shoulder 35 and spring 34 are held within a housing 36, integral with the base 11, by means such as threaded-in plug 37.

The static suppressor according to the invention, in the embodiment illustrated, consists essentially of two parts; these parts are a cup 38, arranged to enclose the disc 32, insulator 26 and lower plate 24, and a cover 39 secured to the grounded upper plate 21. A coil spring 40 tends to force the cup portion 38 into abutment with the cover portion 39, separated therefrom by the sheet 25. A bushing 41 provides an outlet for the lead-out wire 31. For a maximum shielding effect it is desirable that the cover 39 is flush with the lower face of plate 21. In the embodiment illustrated this is accomplished by providing the cover with a recess, formed by a flange 42 which surrounds the plate 21 and is fastened to it by means of a set screw 43. Thus the cover 39 represents electrically and physically an extension of the grounded electrode 21. Alternatively it would be possible to let the plate 21 extend clear through the cover 39, with the lower faces of the cover and of the plate in the same plane.

The operation of the contactor modified by the addition of the static suppressor is as follows:

By proper rotation of the handle 16 the plunger 19 is allowed to rise until plate 21 and cover 39 sufficiently clear the plate 24 to permit the insertion of sheet 25. The handle is then brought into the position shown in the drawing, wherein the sheet is clamped between plates 21 and 24 with a force determined by the compression of spring 34 and between cover 39 and cup 38 with a force determined by the compression of spring 40. Thus the two clamping pressures may be selected independently from each other, by virtue of the clearance provided between disc 32 and the bottom of cup 38, spring 40 being preferably adjusted so that the sheet 25 is gripped between cup 38 and cover 39 with sufficient force to prevent any movement of the external portion of the sheet from interfering with the reading of the instrument. Spring 34 is adjusted to afford the desired pressure for the resistance measurement. After the measurement has been taken, the plunger is again raised and the sheet removed. If an adaptor or a cup attachment such as described in co-pending application Ser. No. 595,093 is to be used, cover 39 should be detached by loosening screw 39 but cup 38 may be left in place. The actual measuring may be carried out by connecting a sensitive electronic indicator between ground and conductor 31 as described in said co-pending application.

It will be seen that the cup 38 and the cover 39, forming part of the low potential side of the input to the instrument, constitute a complete and effective static shield which permits the meter to be operated under the most extreme conditions of static and other electrical influences external to the instrument itself.

It is to be understood that various modifications of the static suppressor shown and described in this specification are possible without constituting a departure from the spirit and scope of my invention as defined in the objects and in the appended claims.

I claim:

1. In combination with a contactor of the character described, adapted for moisture measurements of sheet material and having input electrodes including a manually displaceable electrode grounded to the body of said contactor and an ungrounded electrode yieldably supported on said body, means for electrostatically shielding said ungrounded electrode and adjacent portions of the sheet material to be measured, said means comprising a conductive cup insulatedly surrounding said ungrounded electrode and displaceable relative thereto, a conductive cover concentrically mounted over said cup, means for electrically and mechanically connecting said cover to said grounded electrode in such a manner that a substantially continuous conductive surface is presented to the sheet material to be measured, resilient means urging said cup toward said cover so as to clamp a portion of said sheet material between the cover and the rim of the cup, and means for grounding said cup to the body of the contactor.

2. In combination with a contactor of the character described, adapted for moisture measurements of sheet material and having input electrodes including a manually displaceable electrode grounded to the body of said contactor and an ungrounded electrode yieldably supported on said body, means for electrostatically shielding said ungrounded electrode and adjacent portions of the sheet material to be measured, said means comprising a conductive cup insulatedly surrounding said ungrounded electrode and displaceable relative thereto, a conductive cover concentrically mounted over said cup, means for detachably mounting said cover on said grounded electrode in such a manner that a substantially continuous conductive surface is presented to the sheet material to be measured, an insulated conductor passing through said cup and connected to said ungrounded electrode, resilient means urging said cup toward said cover so as to clamp a portion of said sheet material between the cover and the rim of the cup, and means including said resilient means for grounding said cup to the body of the contactor.

3. In a contactor of the character described, in combination, a body member maintained substantially at ground potential, a cam operated plunger slidably mounted in the head of said member, a disc-shaped electrode conductively secured to the lower end of said plunger, a conductive cover member detachably secured to said electrode so as to form a physical and electrical unit therewith having a substantially continuous lower surface, a stem disposed coaxially with said plunger and held slidably within the lower part of said body member, an insulator supported on said stem, a second disc-shaped electrode carried on said insulator, a first spring tending to elevate said stem, insulator and second electrode, a conductive cup member open at the top, said cup member surrounding said second electrode, said insulator, and the top of said stem in insulated relation to said second electrode, an insulated conductor connected to said second electrode and passing through said cup member, and a second spring tending to elevate said cup member, whereby a piece of sheet material to be tested may be clamped at an intermediate portion thereof between said substantially continuous surface and said lower electrode and may in addition be gripped along a line surrounding said intermediate portion between said surface and the open end of the grounded cup member.

RAYMOND S. HART.

REFERENCES CITED

The following references are of record in the file of this patent:

UNITED STATES PATENTS

| Number | Name | Date |
|---|---|---|
| 2,043,241 | Eyer | June 9, 1936 |
| 2,047,638 | Kott | July 14, 1936 |
| 2,082,364 | Store | June 1, 1937 |
| 2,241,190 | Fenning | May 6, 1941 |
| 2,431,841 | Storm | Dec. 2, 1947 |